United States Patent
Sandstrom et al.

(10) Patent No.: US 6,230,773 B1
(45) Date of Patent: *May 15, 2001

(54) TIRE WITH SIDEWALL CARCASS REINFORCEMENT

(75) Inventors: Paul Harry Sandstrom, Tallmadge; Raymond Dean McQuate, Wadsworth; Mark Samuel Sinsky, Akron, all of OH (US)

(73) Assignee: The Goodyear Tire & Rubber Company, Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,862

(22) Filed: Mar. 17, 1998

(51) Int. Cl.$^7$ .................................................. B60C 17/04
(52) U.S. Cl. ........................ 152/517; 524/307; 524/524
(58) Field of Search ............... 152/517; 524/492, 524/493, 495, 496, 303, 304

(56) References Cited

U.S. PATENT DOCUMENTS

| | | | |
|---|---|---|---|
| 3,255,154 | 6/1966 | Dudley | 260/78.4 |
| 3,873,489 * | 3/1975 | Thurn et al. | 524/262 |
| 4,193,437 * | 3/1980 | Powell | 152/517 |
| 4,278,587 * | 7/1981 | Wolff et al. | 524/262 |
| 4,517,335 * | 5/1985 | Wolff et al. | 524/552 |
| 4,557,859 * | 12/1985 | Maeda et al. | 252/511 |
| 4,917,164 * | 4/1990 | Ushikubo et al. | 152/517 |
| 5,295,526 * | 3/1994 | Tokieda et al. | 152/517 |
| 5,328,949 * | 7/1994 | Sandstrom et al. | 524/492 |
| 5,427,166 * | 6/1995 | Willard, Jr. | 152/454 |
| 5,534,578 * | 7/1996 | Wideman et al. | 524/396 |
| 5,639,320 * | 6/1997 | Oare et al. | 152/517 |
| 5,871,600 * | 2/1999 | Oare et al. | 152/517 |

FOREIGN PATENT DOCUMENTS

| | | | |
|---|---|---|---|
| 0509295 | 3/1992 | (EP) | C08L/9/00 |
| 3-143710 * | 6/1991 | (JP) | 152/517 |
| 4-154411 * | 5/1992 | (JP) | 152/517 |

* cited by examiner

Primary Examiner—Michael W. Ball
Assistant Examiner—Barbara J. Musser
(74) Attorney, Agent, or Firm—Henry C Young, Jr.

(57) ABSTRACT

A tire having at least one crescent-shaped rubber composition as an insert in its sidewall region which is comprised of at least one diene-based elastomer, carbon black and, optionally, silica and at least one of dithiodipropionic acid, benzoic acid and salicylic acid.

5 Claims, 3 Drawing Sheets

TIRE WITH SIDEWALL CARCASS REINFORCEMENT

FIELD

This invention relates to a tire and more particularly to a pneumatic tire designed for optional use without internal air pressure.

BACKGROUND

Tire constructions have been suggested for pneumatic tires which are designed to be run without internal pneumatic pressure, other than ambient atmospheric pressure.

For example, tires have been suggested which have special sidewall inserts designed to improve sidewall stiffness, thereby reducing, or inhibiting, the tire's tendency to go flat without internal air pressure. (see, for example, U.S. Pat. No. 5,368,082). Also, tires have been suggested which have additional plies, such as tires having a total of three plies in their sidewalls, to enhance, or substantially maintain, the tire's performance when running without internal air pressure. (see, for example, U.S. Pat. Nos., 5,427,166 and 5,511,599).

For this invention, it is desired to provide a tire with inserts in its sidewall portion(s) which have enhanced stiffness related properties.

In the description of this invention, the term "phr" where used, relates to parts by weight of specified material, or ingredient, per 100 parts by weight rubber, in a rubber based composition. Such term is well known to those having skill in such art.

Such terms as "compound" or "rubber compound" or "rubber composition" are used interchangeably. The term "compounding ingredient" refers to ingredients, usually including the elastomers themselves, that are blended to form a rubber compound. Such terms are well known to those having skill in such art.

In the description of this invention, the viscoelastic properties E' and Tangent (Tan.) delta values art determined by a Rheovibron instrument at 11 hz at a one tenth percent strain. A Rheovibron instrument from the Tmass company is used. It is understood that use of a Rheovibron instrument and such method of measurement of E' and Tan.Delta is understood by one having skill in the art. The E' and Tan.Delta values are to be determined at 60° C.

The term "runflat" tire, where used, relates to a pneumatic tire which is designed to run without internal air pressure, under ambient conditions, for limited periods of time and speeds.

SUMMARY AND PRACTICE OF THE INVENTION

In accordance with this invention, a tire is provided comprised of a toroidally-shaped carcass and an outer, circumferential tread designed to be ground-contacting, wherein said carcass is comprised of two spaced apart inextensible bead portions, two spaced apart sidewalls each individually extending radially inward from and connecting said tread to said bead potions, and at least one cord reinforced ply extending from bead to bead and through the sidewalls; an improvement in which a substantially crescent shaped rubber insert is juxtapositioned to and axially inward of at least one of said carcass plies in each of said sidewalls or the tire; wherein the rubber composition of said insert has a Shore A hardness at 100° C. in a range of about 65 to about 85, a 100 percent Modulus in a range of about 3.5 to about 10 MPa, a Hot Rebound at 100° C. in a range of about 60 to about 80, an E' value in a range of about 2 to about 20 MPa at 60° C. and a Tan.Delta value at 60° C. in a range of about 0.03 to about 0.15; and wherein said rubber composition of said insert is comprised of, based on 100 parts by weight rubber, (A) at least one diene-based elastomer, (B) about 30 to about 100 phr of particulate reinforcement as carbon black and, optionally, silica, and (C) about 0.5 to about 10 phr of at least one of dithiodipropionic acid, benzoic acid and salicylic acid.

Preferably, the material (C) is 3,3' dithiodipropionic acid, although it is understood that it may exist in a 2,2' isomeric form.

It is to be appreciated that the insert is sulfur co-cured with the tire assembly of said tread and carcass as a whole.

Preferably, the insert(s) have a maximum thickness at a location about midway between the bead portions and the tread in the sidewall region of the tire.

In one aspect of the invention, said dithiodipropionic acid, benzoic acid and/or salicylic acid are added by either (i) adding in-situ with ingredients for the said rubber composition or (ii) with the rubber composition as a composite of carbon black and/or silica pre-treated with at least one of said acids such as, for example, by organic solvent deposition or melt dispersion methods. For example, at least one of said acids may be adsorbed, absorbed, coated or melted, such as, for example, melt-spraying of molten material, onto the surface of said carbon black and/or silica filler.

By blending one or more of said acids, preferably the dithiodipropionic acid, in-situ with ingredients of the rubber composition, it is meant that it is added to and mixed with the rubber composition as an individual ingredient.

By pre-blending one or more of such acids, preferably the dithiodipropionic acid, with at least a portion of the carbon black and/or silica it is meant that it is pre mixed with the carbon black and/or silica prior to form a composite thereof and such composite is added to and mixed with ingredients for the rubber composition as an individual ingredient.

By mixing with ingredients for the rubber composition, it is meant that one or more of the said acids, or said composite, as the case may be, is blended with the elastomer (s) as well as conventional compounding ingredients used for the rubber composition for the insert, conventionally in an internal rubber mixer. It is preferred the said acid, preferably the dithiodipropionic acid, or said composite, as the case may be, is mixed with the compounding ingredients in the absence of curatives such as sulfur and vulcanization accelerators, and that such curatives are subsequently blended with the rubber composition after said acid or composite addition.

Alternatively, although not generally preferred, a portion of or all of the acid, or composite, may be added to the rubber composition with the curatives.

The dithiodipropionic acid may typically be characterized by having a melting point in the range of about 153 to about 159° C. Such melting point can conveniently be determined by a differential scanning calorimeter (DSC) at a heating rate of 10° C. per minute.

It is considered herein that the utilization of the said acids, particularly the 3,3'-dithiodipropionic acid, for the rubber filler composition is significant in order to enhance the stiffness of the sulfur vulcanized rubber composition of the insert as well as to endeavor to substantially maintain a relatively low hysteresis.

In the practice of this invention, a significant function of the rubber composition based fillers in the sidewall portion of the tire is to stiffen/support the sidewall structure when the tire is operated without inflation pressure.

The rubber composition based inserts are elastomeric in nature having a substantially crescent cross-sectional shape and material properties selected to enhance inflated ride performance while promoting the tire's run-flat durability. The inserts, if desired, may also be individually reinforced with cords or short fibers. Thus, one or more of such inserts may be so-reinforced.

The shape of the fillers is described as being substantially crescent in shape. This is intended to also include an entrunkated crescent shape, particularly where the entrunkated portion of the crescent shaped filler is juxtapositioned to the tire's bead portion.

In further practice of the invention, said tire carcass may have from one to three plies comprised of a first axially inner ply and optionally one or two additional plies as a second ply and third ply, respectively, each additional ply positioned sequentially axially outward from said first ply in the sidewall region of the tire.

Accordingly, in accordance with this invention said tire contains one ply in its carcass wherein said insert is juxtapositioned to and axially inward of said ply in the sidewall region of the tire.

In further accordance with this invention, said tire contains, in its carcass, an axially inner first ply and a second ply axially outward from the first ply; wherein said insert is juxtapositioned to and axially inward of said first ply, in the sidewall region of the tire.

In additional accordance with this invention, said tire contains, in its carcass, an axially inner first ply and an axially outer second ply; wherein said insert is juxtapositioned to and interposed between said first and second ply, in the sidewall region of the tire.

In further accordance with this invention, said tire contains, in its carcass, an axially inner first ply and an axially outer second ply; wherein one of said inserts is juxtapositioned to and interposed between said first and second ply, in the sidewall region of the tire, and another of said inserts is juxtapositioned to and axially inward of said first ply, in the sidewall region of the tire.

In further accordance with this invention, said tire contains, in its carcass, an axially inner first ply, a second ply axially outward from said first ply and a third ply axially outward from said second ply; wherein said insert is juxtapositioned to and axially inward of said first ply, in the sidewall region of the tire.

In additional accordance with this invention, said tire contains, in its carcass, an axially inner first ply, a second ply axially outward from said first ply and a third ply axially outward from said second ply; wherein said insert is juxtapositioned to and interposed between (a) said first and second plies and/or (b) said second and third plies, in the sidewall region of the tire.

In further accordance with this invention, said tire contains, in its carcass, an axially inner first ply, a second ply axially outward from said first ply and a third ply axially outward from said second ply; wherein said insert is juxtapositioned to and interposed between (a) said first and second plies and/or (b) said second and third plies, in the sidewall region of the tire and, also, an insert juxtapositioned to and axially inward of the innermost of said plies.

In one embodiment, the innermost ply, or plies, has synthetic or textile cord reinforcement of polyester, nylon, rayon or aramid, preferably nylon; while the outermost ply preferably has aramid, carbon fiber, fiberglass or metal cord reinforcement, preferably brass and/or zinc coated steel cords.

Thus, in a preferred embodiment, the first ply has reinforcing cords of nylon, an aramid fiber, and the second and additional plies are steel cords.

The term "ply" is contemplated to include cord reinforced inserts which do not extend entirely from one bead core to the opposite bead core. It is, however, contemplated that at least one ply must extend from bead core to the opposite bead core, preferably a radial ply. A second ply can extend from a bead core to just laterally under one or more of the reinforcing belts of the belt structure.

In one aspect, the outermost ply preferably has cords of a higher modulus (i.e.: steel cords) and the innermost ply, or plies, have cords of a lower modulus (i.e.: nylon or rayon).

At least one ply, preferably the innermost ply, extended from bead core to bead cord and wraps around the bead core. Alternatively, where two or more plies are used, at least one of the additional plies, while extending from bead core to bead core, does not actually wrap around the bead core.

DEFINITIONS

"Axial" and "axially", where used, means directions that are parallel to the axis of rotation of the tire.

"Bead portion" means generally that part of the tire comprising an annular inextensible tensile member such as a multiplicity of annular wires surrounded by an elastomer composition(s), and is associated with holding the tire to the rim being wrapped by ply cords and shaped, with or without other reinforcement elements such as flippers, chippers, apexes or fillers, toe guards and chaffers. The bead core usually refers to the wire beads of the bead portion but sometimes may refer to the bead portion itself.

"Belt Structure" or "Reinforcing Belts", where used, means at least two annular layers or plies of parallel cords, woven or unwoven, underlying the tread, unanchored to the bead, and having both left and right cord angles in the range from 17° to 27° with respect to the equatorial plane of the tire.

"Circumferential" may be used in the description to relate to a direction extending along (around) the outer perimeter of the surface of the tire carcass such as, for example, the circumferential tread on the carcass.

"Carcass" means the tire structure apart from the tread but including supporting plies, sidewalls and the beads or bead portions.

"Chafers", where used herein, refers to narrow strips of material placed around the outside of the bead to protect cord plies from the rim, distribute flexing above the rim.

"Cord" means one of the reinforcement strands of which the plies in the tire are comprised. "Innerliner", where used herein, means the layer or layers of elastomer or other material that form the inside surface of a tubeless tire and that contain the inflating fluid within the tire.

"Ply" means a layer of rubber-coated parallel cords.

"Radial" and "radially" mean directions radially toward or away from the axis of rotation of the tire.

"Radial Ply Tire", if used herein, means a belted or circumferentially-restricted pneumatic tire in which at least one ply has cords which extend from bead to bead are laid at cord angles between 65° and 90° with respect to the equatorial plane of the tire.

"Shoulder", if used herein, means the upper portion of sidewall just below the tread edge.

"Sidewall" means that portion of a tire between the tread and the bead.

DETAILED DESCRIPTION

Figure 1:
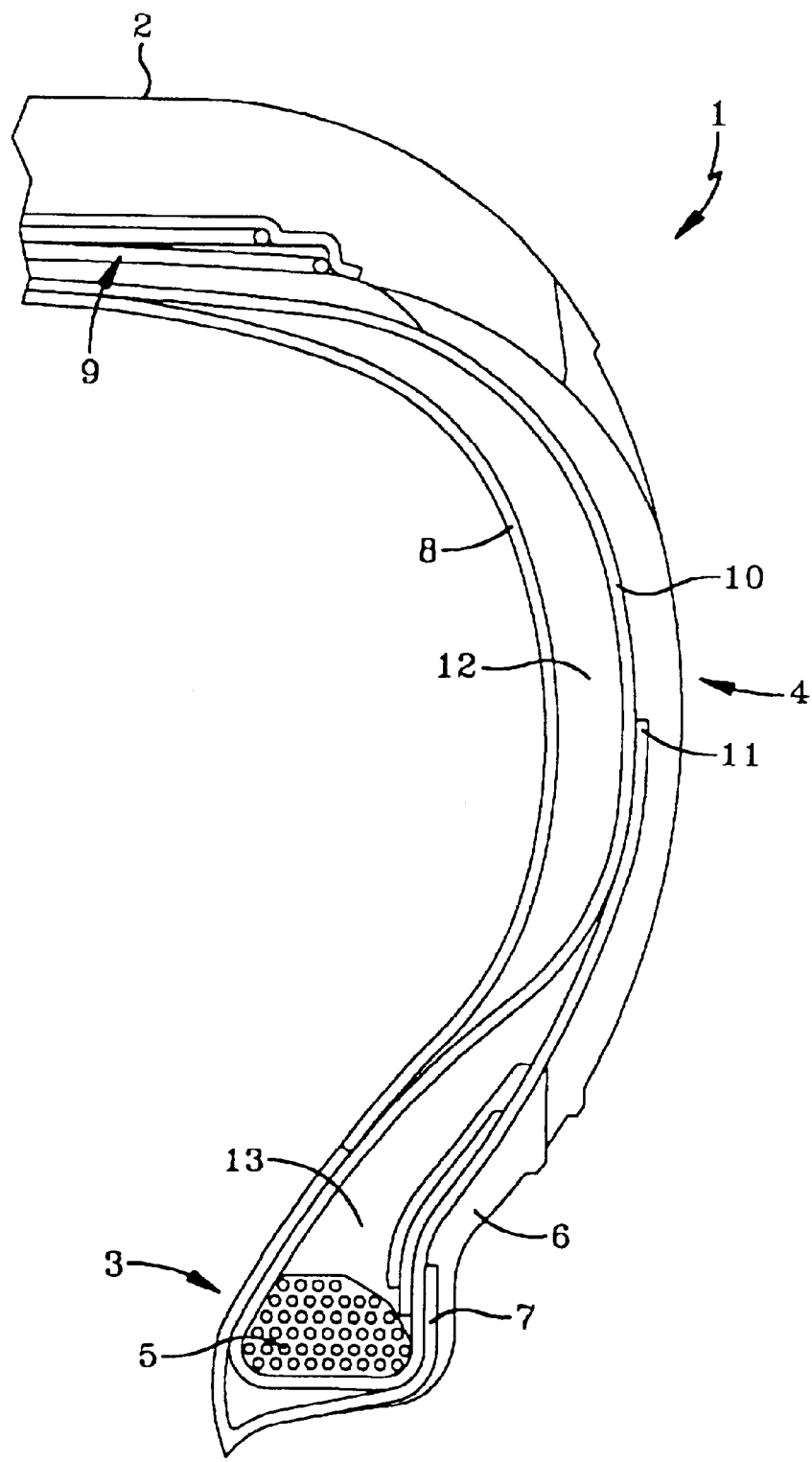
FIG. 1 is a fragmentary cross-sectional view of a tire showing its tread and carcass with one ply and one insert axially inward of the ply in the sidewall region of the tire as an embodiment of the invention.
Figure 2:
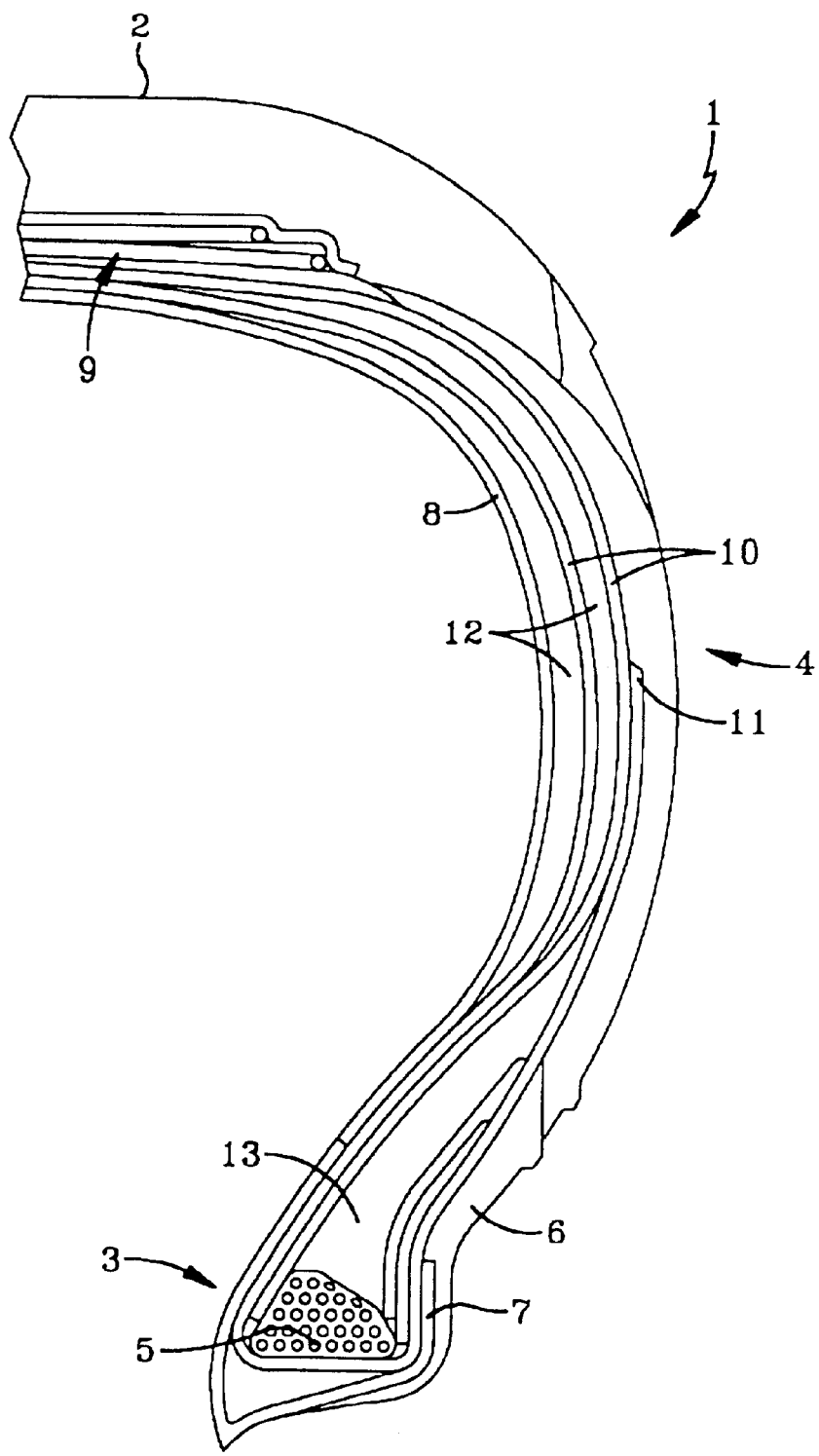
FIG. 2 is a fragmentary cross-sectional view of tire showing its tread and carcass with two plies, a second insert interposed between the plies and a second ply axially outward of the innermost ply in the sidewall region of the tire as an embodiment of the invention.
Figure 3:
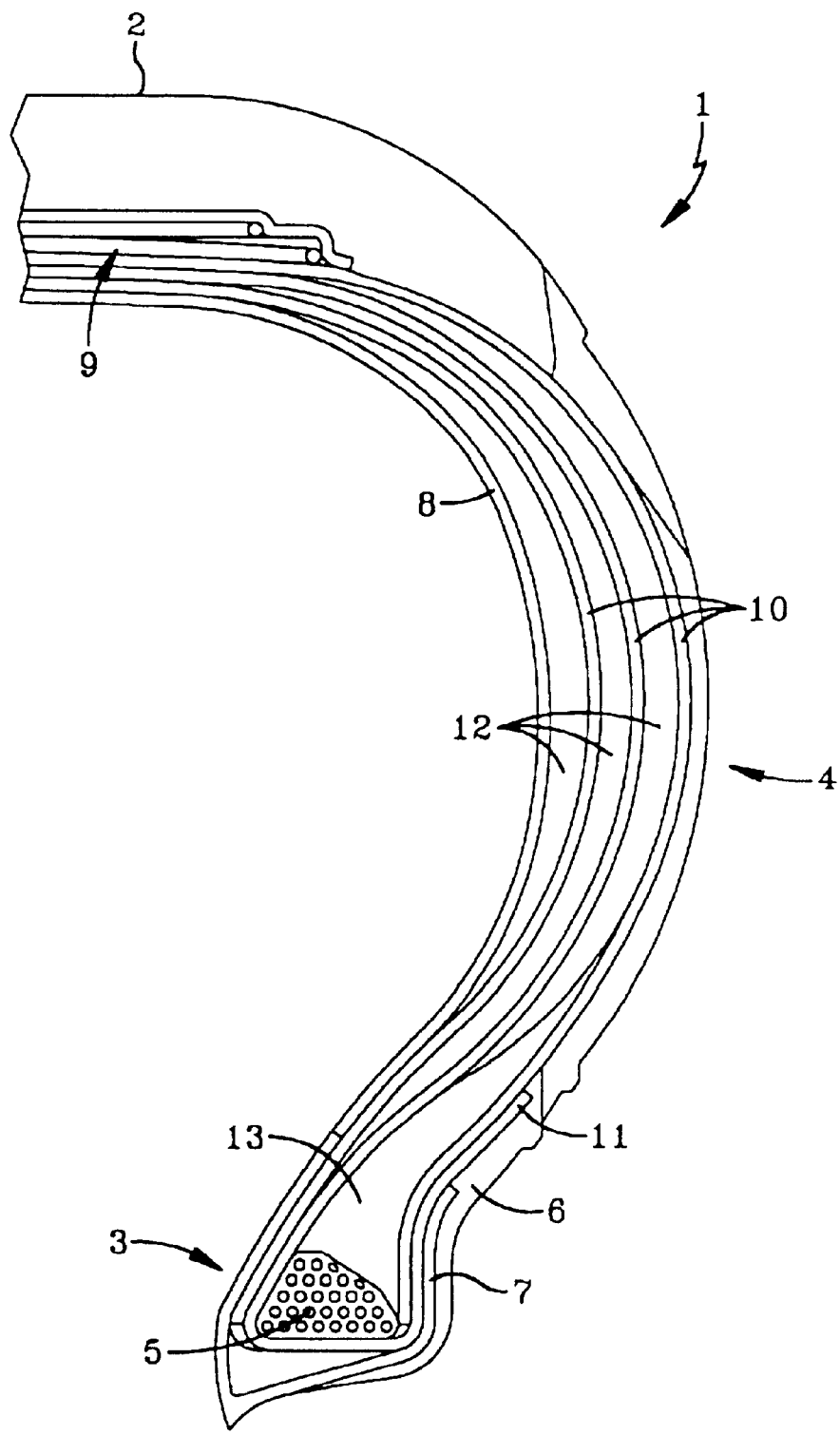
FIG. 3 is a fragmentary cross-sectional view of a tire showing its tread and carcass with three plies, inserts between the plies and another insert axially inward of the innermost ply in the sidewall region of the tire as an embodiment of the invention.

Referring to the drawings FIGS. 1, 2 and 3 show the fragmentary cross-section of a tire (1), its tread (2), bead portion (3), sidewall or sidewall region (4), inextensible wire bead core (5), rubber chafer (6), rubber toeguard (7), rubber composition innerliner (8), belt structure (9) underlying a portion of the tread (2), carcass ply (10), carcass ply turn-up (11), insert (12) and apex (13).

The cords for use in the carcass plies may comprise from one (monofilament) to multiple twisted filaments. The number of total filaments in the cord may range from 1 to 13.

The cords, particularly metallic cords, of the carcass ply are generally oriented such that the tire according to the present invention is what is commonly referred to as a radial.

The steel cord of the carcass ply intersect the equatorial plane (EP) of the tire at an angle in the range of from 75° to 105°. Preferably, the steel cords intersect at an angle of from 82° to 98°. A more preferred range is from 89° to 91°.

The first and second reinforcing ply structure each may comprise a single ply layer, however, any number of carcass plies may be used.

As further illustrated in the Figures, the first ply structure has a pair of turn-up ends respectively which wrap about each bead core 5 of the bead portion 3 of the carcass. The ends 11 of the second ply 10 are in proximity to the bead core 5 and terminate radially adjacent on either side of the bead core 5, above the bead core 5 or can be wrapped around the bead core 5 and terminates radially below the turn-up end 11 of the first ply 10 as shown. The turn-up ends 11 of the first ply 10 wrap about the second ply ends and the bead core 5. The turn-up ends of the first ply 11 terminates radially a distance above the nominal rim diameter of the tire 1 in proximity to the radial location of the maximum section width of the tire. In a preferred embodiment, the turn-up ends are located within 20% of the section height of the tire from the radial location of the maximum section width, most preferably terminating at the radial location of the maximum section width.

The bead core 5 is preferably constructed of a single or monofilament steel wire continuously wrapped.

Located within the bead region 3 and the radially inner portions of the sidewall portions 4 are high modulus elastomeric apex inserts disposed between carcass reinforcing structure 11 and the turn-up ends 11, respectively. The elastomeric apex inserts 13 extend from the radially outer portion of bead portions respectively, up into the sidewall portion gradually decreasing in cross-sectional width. The elastomeric apex inserts 13 terminate at a radially outer end.

The inserts 12 may extend from each bead region radially to the edge of the tread, usually to just beneath the reinforcing belt structures 9. As illustrated in the Figures, the sidewall portions may each include a first insert 12 and a second insert 12 and even a third insert 12. The first inserts 12 are positioned as described above. The second inserts 12 are located (interposed) between the first and the second plies 10 respectively. The second insert 12 extends from each bead region 3, or portion, radially outward to the edge of the tread 2, namely to just beneath the reinforcing belt structure 9.

In one embodiment, the first inserts 10 each have a thickness at its maximum thickness of at least three percent of the maximum section height "SH" at a location approximately radially aligned the maximum section width of the tire.

The second insert, and third insert, if used, has a thickness at its maximum thickness of at least one and one-half percent (1.5%) of the maximum section height of the tire at the location radially above the maximum section width of the tire. In a preferred embodiment the elastomeric second inserts, and third insert, if used, each have a thickness of approximately one and one-half percent (1.5%) of the maximum section height SH of the tire at a radial location of about 75% of the section height SH. For example, in a P275/40ZR17 size high performance tire this thickness of the second insert of the tire equals 0.08 inches (2 mm). At the location approximately radially aligned with the location of the maximum section width of the tire, the thickness of the second insert is 0.05 inches (1.3 mm).

The overall cross-sectional thickness of the combination of elastomeric inserts preceding from the bead portions to the radial location of the maximum section width (SW) is preferably of constant thickness. The overall sidewall and carcass thickness is at least 0.45 inches (11.5 mm) at the maximum section width location and increases to an overall thickness in the region where it merges into the shoulder near the lateral tread edges. Preferably, the overall thickness of the sidewall in the shoulder region of the tire is at least one hundred percent (100%) of the overall sidewall thickness at the maximum section width (SW). This ratio means that the sidewall can be made substantially thinner than the predecessor type runflat tires.

As previously discussed, the tire of the present invention has at least one ply having a turn-up end 11 (wrapped around the bead core 5) while another ply can simply be terminated adjacent to the bead core 5 without actually wrapping around the bead core 5.

The first insert 12 is preferably made of elastomeric material. The first insert 12 is designed to prevent the tire's sidewall from collapsing when operating under no inflation pressure. The insert 12 can be of a wide range of shore A hardnesses from a relative soft shore A of about 50 to very hard 85, the material shape and cross-sectional profile is modified accordingly to insure the ride performance and sidewall spring rate is acceptable. The stiffer the material the thinner the cross-section generally.

The second insert 12, and third insert 12, if used, can be of the same or different material physical properties relative to the first insert. This means that the combination of a hard second insert 12, and/or third insert 12 if used, with a softer first insert 12 is contemplated as well as the combination of a hard first insert 12 with a softer second and/or third insert 12. The elastomeric materials of the second insert may similarly be in the 50 to 85 shore A range.

The second insert 12 and third insert 12, if used, as shown in the Figures, is made of elastomeric material. These inserts 12 can be used in multiples of inserts interposed between adjacent plies when more than two plies are used in the carcass structure.

The second inserts 12, and third inserts 12, when used, when unreinforced with fibers, act as a spacer between the adjacent plies. The cords of the plies particularly the radially outer ply is placed in tension when the tire is operated uninflated.

In practice, the rubber compositions for the inserts 12 utilized in this invention for the aforesaid pneumatic tire construction are preferably characterized by physical properties which enhance their utilization in the invention which are, collectively, believed to be a departure from properties of rubber compositions normally used in pneumatic tire sidewalls, particularly the combination of inserts 12 and with plies 10 having a combination of either dissimilar or similar high stiffness yet essentially low hysteresis properties.

In particular, for the purposes of this invention, the aforesaid inserts 12 are designed to have a high degree of stiffness yet also having a relatively low hysteresis for such a degree of stiffness. This enabled the benefits of the change in moduli of the reinforcing cords to be fully appreciated.

The stiffness of the rubber composition for inserts 12 is desirable for stiffness and dimensional stability of the tire sidewall 4.

A similar stiffness of the rubber composition for the ply coat for one or more of plies is desirable for overall dimensional stability of the tire carcass, including its sidewalls, since it extends through both sidewalls and across the crown portion of the tire.

However, it is to be appreciated that rubbers with a high degree of stiffness in pneumatic tires normally be expected to generate excessive internal heat during service conditions (operating as tires on a vehicle running under load and/or without internal inflation pressure), particularly when the rubber's stiffness is achieved by a rather conventional method of simply increasing its carbon black content. Such internal heat generation within the rubber composition typically results in a temperature increase of the stiff rubber and associated tire structures which can potentially be detrimental to the useful life of the tire 1.

The hysteresis of the rubber composition is a measure of its tendency to generate internal heat under service conditions. Relatively speaking, a rubber with a lower hysteresis property generates less internal heat under service conditions than an otherwise comparable rubber composition with a substantially higher hysteresis. Thus, in one aspect, a relatively low hysteresis is desired for the rubber composition for the fillers and the plycoat(s) for one or more of the plies 10.

Hysteresis is a term for heat energy expended in a material (e.g.: cured rubber composition) by applied work and low hysteresis of a rubber composition is indicated by a relatively high rebound and relatively low tangent delta (Tan. Delta) property values.

Accordingly, it is important that the rubber compositions for one or more of the inserts 12 and plycoats for one or more of plies 10 have the properties of both relatively high stiffness and low hysteresis.

The following selected desirable properties of the rubber compositions for the inserts 12 are summarized in the following Table A.

TABLE A

| Properties | Filler |
|---|---|
| Hardness 100° C. (Shore A)[1] | 65–85 |
| Modulus (100%) MPa[2] | 3.5–10 |
| Hot Rebound (100° C.)[3] | 60–80 |
| E' at 60° C. (MPa)[4] | 2–20 |
| Tan.Delta 60° C.[4] | 0.03–0.15 |

[1]Shore Hardness Test-ASTM Test No. D2240.
[2]Tension Modulus Test-ASTM Test No. D412.
[3]Zwick Rebound Test-DIN 53512.
[4]Rheovibron at 11 Hz, one tenth percent strain.

Alternatively, where two or more inserts are used, the first insert may have properties the same as or different from the second or third inserts, if used, within the above stated ranges.

For example, the innermost insert may have a Shore A hardness in a range of about 65 to about 75, a 100 percent modulus in a range of about 3.5 to about 8 MPa, and E' in a range of about 2 to about 15 MPa at 60° C. and a Tan.Delta at 60° C. in a range of about 0.03 to about 0.1 and said outward insert(s) may have a Shore A hardness in a range of about 70 to about 85, a 100 percent modulus in a range of about 5 to about 10 MPa, and E' in a range of about 5 to about 20 MPa at 60° C. and a Tan Delta at 60° C. in a range of about 0.05 to about 0.15.

The indicated hardness property is considered to be an expanded range of moderate rubber hardness permitted by the use of the unique ply cord structure.

The indicated modulus property at 100% modulus is utilized instead of a 300% modulus because the cured rubber has a relatively low ultimate elongation at its breaking point. Such a cured rubber is considered stiff.

The indicated E' property is a coefficient of the storage or elastic moduli component of the viscoelastic property which is an indication of the material (e.g.: cured rubber composition) stiffness where a higher E' value indicates a higher stiffness.

The indicated Tan. Delta property is a measure of the rubber composition's heat build up which is an indication of the hysteretic nature of the material (e.g.: cured rubber composition) with a relatively low Tan Delta value at 100° C. being indicative of a relatively low hysteresis and a relatively low heat build up quality.

The utilization of both the E' and Tan.Delta properties to characterize stiffness and hysteresis of rubber compositions is well known to those having skill in such characterizations of rubber.

The indicated hot rebound test property at about 100° C. is measured by Zwick Rebound Test (DIN 53512) test and is indicative of the material's (e.g.: cured rubber composition) resilience.

Thus, the properties illustrated in the previous Table A indicate a cured rubber composition with a relatively high stiffness, moderate hardness and a relatively low hysteresis for a rubber with such a high stiffness.

The low hysteresis is demonstrated by the relatively low Tan.Delta, and high rebound properties and is considered necessary for a rubber composition desired to have a relatively low internal heat buildup in service.

In the compounding of the various tire components, various rubbers may be used which are, preferably, relatively high unsaturation diene-based rubbers. Representative examples of such rubbers are, although they may not be so limited, are: styrene-butadiene rubber, natural rubber, cis 1,4 and trans 1,4-polyisoprene rubbers, cis 1,4, vinyl 1,2-and trans 1,4-polybutadiene rubbers, styrene-isoprene-butadiene rubber, styrene-isoprene rubber and isoprene-butadiene rubber.

Various of the preferred rubbers for the rubber compositions for the fillers and for the plycoat(s) for one or more of the plies are natural cis 1,4-polyisoprene rubber, isoprene/butadiene rubber, and cis 1,4-polybutadiene rubber.

Preferred combinations, or blends, of rubbers are natural and synthetic cis 1,4-polyisoprene rubber and cis 1,4-polybutadiene rubber for the fillers and natural cis 1,4-polyisoprene rubber, cis 1,4-polybutadiene rubber and isoprene/butadiene copolymer rubber for the plycoat(s).

In a preferred practice, based on 100 parts by weight rubber, (A) the fillers are comprised of about 60 to 100, preferably about 60 to 90, parts natural rubber and, correspondingly, up to about 40, preferably about 40 to about 10, parts of at least one of cis 1,4 polybutadiene rubber and isoprene/butadiene rubber preferably cis 1,4-polybutadiene rubber, where said isoprene/butadiene rubber, if used, is present in a maximum of 20 parts, and (B) the said plycoat(s) are comprised of up to 100, preferably about 80 to about 100 and more preferably about 80 to about 95, parts natural rubber and, correspondingly, up to about 100, preferably up to about 20 and more preferably about 20 to about 5, parts of at least one of isoprene/butadiene copolymer rubber and cis 1,4 polybutadiene rubber, preferably an isoprene/butadiene rubber; wherein the ratio of isoprene to butadiene in said isoprene/butadiene copolymer rubber is in a range of about 20/80 to about 80/20.

It is further contemplated, and is considered to be within the intent and scope of this invention that a small amount, such as about 5 to about 15 parts, of one or more organic solution polymerization prepared rubbers may be included with the aforesaid natural rubber, and cis 1,4-polybutadiene rubber and/or isoprene/butadiene rubber composition(s) for the said fillers and/or plycoat(s), of which the option and selection of such additional rubber(s) can be made by one having skill in the rubber compounding art without undue experimentation.

Thus, in such circumstance, the description of the filler and plycoat rubbers is set forth in a "comprising" manner with the intent that small amounts of such solution polymerization prepared elastomers can be added so long as the aforesaid physical property parameters of the cured rubber compositions are met. It is considered that such rubber compounding is within the skill of those with experience in the rubber compounding art without undue experimentation.

While not necessarily limited thereto, such other contemplated solution prepared rubbers are styrene/butadiene, and polymers of one or more of isoprene and butadiene such as trans 1,4-polyisoprene, trans 1,4-polybutadiene, styrene/isoprene/butadiene terpolymers and medium vinyl polybutadiene.

It should readily be understood by one having skill in the art that rubber compositions for components of the pneumatic tire, including the first and second fillers can be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as rubber processing oils, resins including tackifying resins, silicas, and plasticizers, fillers, pigments, stearic acid or other materials such as tall oil resins, zinc oxide, waxes, antioxidants and antiozonants, peptizing agents and reinforcing materials such as, for example, carbon black. As known to those skilled in the art, depending on the intended use of the sulfur vulcanizable and sulfur vulcanized materials (rubbers), the certain additives mentioned above are selected and commonly used in conventional amounts.

Typical additions of carbon black comprise about 30 to about 100 parts by weight, of diene rubber (phr), although about 40 to about a maximum of about 70 phr of carbon black is desirable for the high stiffness rubbers desired for the indicated fillers and plycoat(s) used in this invention. Typical amounts of resins, if used, including tackifier resins and stiffness resins, if used, including unreactive phenol formaldehyde tackifying resins and, also stiffener resins of reactive phenol formaldehyde resins and resorcinol or resorcinol and hexamethylene tetramine may collectively comprise about 1 to 10 phr, with a minimum tackifier resin, if used, being 1 phr and a minimum stiffener resin, if used, being 3 phr. Such resins may sometimes be referred to as phenol formaldehyde type resins. Typical amounts of processing aids comprise about 4 to about 10.0 phr. Typical amounts of silica, if used, comprise about 5 to about 50, although 5 to about 15 phr is desirable and amounts of silica coupling agent, if used, comprise about 0.05 to about 0.25 parts per part of silica, by weight. Representative silicas may be, for example, hydrated amorphous silicas. A representative coupling agent may be, for example, a bifunctional sulfur containing organo silane such as, for example, bis-(3-triethoxy-silylpropyl) tetrasulfide, bis-(3-trimethoxy-silylpropyl) tetrasulfide and bis-(3-trimethoxy-silylpropyl) tetrasulfide grafted silica from DeGussa, AG. Typical amounts of antioxidants comprise 1 to about 5 phr. Representative antioxidants may be, for example, diphenyl-p-phenylenediamine and others, such as those disclosed in *The Vanderbilt Rubber Handbook* (1978), pages 344–346. Suitable antiozonant(s) and waxes, particularly microcrystalline waxes, may be of the type shown in *The Vanderbilt Rubber Handbook* (1978), pages 346–347. Typical amounts of antiozonants comprise 1 to about 5 phr. Typical amounts of stearic acid and/or tall oil fatty acid may comprise about 1 to about 3 phr. Typical amounts of zinc oxide comprise about 2 up to about 8 or 10 phr. Typical amounts of waxes comprise 1 to about 5 phr. Typical amounts of peptizers comprise 0.1 to about 1 phr. The presence and relative amounts of the above additives are not an aspect of the present invention, so long as the hardness and modulus value requirements of the filler(s) used in the tire sidewalls in the practice of this invention.

The vulcanization of the rubber composition(s) is/are conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 8 phr with a range of from 3 to about 5 being preferred for the stiff rubbers desired for use in this invention.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 3 phr. In another embodiment, combinations of two or more accelerators in which a primary accelerator is generally used in the larger amount (0.5 to about 2 phr), and a secondary accelerator which is generally used in smaller amounts (0.05–.50 phr) in order to activate and to improve the properties of the vulcanizate. Combinations of such accelerators have historically been known to produce a synergistic effect of the final properties of sulfur cured rubbers and are often somewhat better than those produced by use of either accelerator alone. In addition, delayed action accelerators may be used which are less affected by normal processing temperatures but produce satisfactory cures at ordinary vulcanization temperatures. Representative examples of accelerators include amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound, although a second sulfenamide accelerator may be used. In the practice of this invention, one and sometimes two or more accelerators are preferred for the high stiffness rubbers.

The tire can be built, shaped, molded and cured by various methods which will be readily apparent to those having skill in the art.

EXAMPLE I

Pre-treated carbon black and pre-treated silica reinforcing fillers are prepared by pre-treating the fillers with 3,3'-dithiodipropionic acid.

The fillers were individually pre-treated by first dissolving the dithiodipropionic acid in acetone (20 ml/g) under reflux conditions. The solution was cooled slightly and mixed with a stirred suspension of the selected particulate filler in acetone. The pre-treated filler was recovered by removing the acetone via a Roto-vac instrument which utilizes a combination of heat and vacuum to remove the acetone solvent while rotating the mixture in a flask.

The following Table 1 summarizes the pre-treated filler showing the amounts of dithiodipropionic acid per 100 parts of filler.

Fillers M and N are carbon black pre-treated with 3,3'-dithiodipropionic acid. Fillers X and Y are silica pre-treated with 3,3'-dithiodipropionic acid.

TABLE 1

| | Pre-Treated Fillers | | | |
| | Parts by Weight | | | |
| Material | Filler M | Filler N | Filler X | Filler Y |
| --- | --- | --- | --- | --- |
| Carbon Black[1] | 100 | 100 | 0 | 0 |
| Silica[2] | 0 | 0 | 100 | 100 |
| DTDP[3] | 4 | 8 | 4 | 8 |

[1]N299 carbon black.
[2]HiSil-210 from PPG Industries, Inc.
[3]3,3'-dithiodipropionic acid.

EXAMPLE II

Rubber compositions were prepared using the pre-treated fillers of Example I, namely the carbon black and silica reinforcing fillers which had been pre-treated with dithiodipropionic acid. Formulations for the rubber compositions are shown in Table 2.

The Control rubber composition Sample A contained both carbon black and silica reinforcing fillers which had not been pre-treated with dithiodipropionic acid.

Sample B is identical to the control with the exception of the in-situ addition of 2 phr dithiodipropionic acid during the Banbury mixing step. In other words, for Sample B while 3,3'-dithiodipropionic acid is used, the carbon black and silica were not pre-treated with such material.

Samples C, D and E contain dithiodipropionic acid pre-treated carbon black and/or silica Samples M, N, X and Y of Example 1.

Thus, rubber compositions B, C, D and E contain 2 phr dithiodipropionic which was added (1) individually during the rubber composition mixing step (Sample B) or (2) as pre-treated filler during the rubber composition mixing step (Samples C, D and E).

Samples A–E all contain silica coupling agent added during the non-productive stage of mixing.

Rubber compositions represented by samples F and G compare the in-situ addition of the dithiodipropionic acid (Sample F) with the addition of pre-treated carbon black and pre-treated silica (Sample G), all in the absence of coupling agent.

For this Example, the rubber compositions were prepared by first blending the rubber and ingredients, except for the sulfur curatives and accelerators in a non-productive mixing stage in an internal rubber mixer to a temperature of about 160° C. for about 4 minutes.

To the rubber composition was then mixed the sulfur and accelerators in a final productive mix stage in an internal rubber mixer to a temperature of about 105° C. for about 2 minutes.

The terms "non-productive" and "final productive" mixing stages are well known to those having skill in the rubber mixing art.

TABLE 2

Silica and CB Filled Compounds

| Sample # | A | B | C | D | E | F | G |
|---|---|---|---|---|---|---|---|
| Pretreated/In-situ | Control | In-situ | Pretreated Silica | Pretreated CB | Pretreated Silica/CB | In-situ | Pretreated Silica/CB |
| Non-Productive | | | | | | | |
| Polyisoprene[1] | 100 | 100 | 100 | 100 | 100 | 100 | 100 |
| Carbon Black[2] | 25 | 25 | 25 | 0 | 0 | 25 | 0 |
| Silica[3] | 25 | 25 | 0 | 25 | 0 | 25 | 0 |
| Oil[4] | 5 | 5 | 5 | 5 | 5 | 5 | 5 |
| Zinc Oxide | 5 | 5 | 5 | 5 | 5 | 5 | 5 |
| Stearic Acid | 2 | 2 | 2 | 2 | 2 | 2 | 2 |
| Coupler[5] | 5 | 5 | 5 | 5 | 5 | 0 | 0 |
| Filler M (CB) | 0 | 0 | 0 | 0 | 26 | 0 | 26 |
| Filler N (CB) | 0 | 0 | 0 | 27 | 0 | 0 | 0 |
| Filler X (Silica) | 0 | 0 | 0 | 0 | 26 | 0 | 26 |
| Filler Y (Silica) | 0 | 0 | 27 | 0 | 0 | 0 | 0 |
| DTDP | 0 | 2 | 0 | 0 | 0 | 2 | 0 |
| Productive | | | | | | | |
| Accelerators | 2.5 | 2.5 | 2.5 | 2.5 | 2.5 | 2.5 | 2.5 |
| Sulfur | 1.5 | 1.5 | 1.5 | 1.5 | 1.5 | 1.5 | 1.5 |

Conventional amounts of rubber processing oil (five parts), stearic acid (two parts) and zinc oxide (5 parts), therefore, were used with two accelerators.
1. Cis 1,4-polyisoprene NATSYN® 2200 from The Goodyear Tire & Rubber Company.
2. N299 carbon black.
3. Silica obtained as HiSil 210 from PPG.
4. 3,3'-dithiodipropionic acid.
5. A 50/50 composition of bis-3-(triethoxysilylpropyl) tetrasulfide carbon black obtainable as X50S from Degussa AG.

The rubber compositions of Table 2 were cured at a temperature of about 150° C. for about 36 minutes.

Cure behavior and cured physical properties for the rubber compositions are shown in Table 3.

As shown in Table 3, the addition of the 2 phr of dithiodipropionic acid by in-situ or by pre-treated reinforcing filler resulted in an increased stiffness as evidenced by the rubber compositions 100% modulus, hardness and Rheovibron E' properties.

Further, samples F and G illustrate comparative physical properties for in-situ verses pre-addition in the absence of silica coupling agent. Thus, the stiffness related physical properties were similar.

EXAMPLE III

Rubber compositions were prepared containing silica filler reinforcement as shown in Table 4. They were prepared in a manner similar to Example II. Sample H is the Control without the dithiodipropionic acid whereas Sample I contains the pre-treated silica of Example I and Sample J contains an in-situ addition of the dithiodipropionic acid.

TABLE 3

| Sample # | A | B | C | D | E | F | G |
|---|---|---|---|---|---|---|---|
| Rheometer | | | | | | | |
| Max Torque | 49 | 52 | 52.8 | 52.7 | 51.2 | 46 | 48.2 |
| Min Torque | 5 | 4.8 | 5*3 | 5.5 | 6.2 | 5.3 | 7.7 |
| delta Torque | 44 | 47.2 | 47.5 | 47.2 | 45 | 40.7 | 40.5 |
| $T_{90}$ | 15.2 | 26.7 | 22.8 | 23.8 | 19 | 19.3 | 16.7 |
| $T_2$ | 5.1 | 6.9 | 5.3 | 5.7 | 5.9 | 9.3 | 7.4 |
| Physicals | | | | | | | |
| 100% Mod, MPa | 3.6 | 4.2 | 4.1 | 4.2 | 4.0 | 2.9 | 3 |
| 300% Mod, MPa | 16.2 | 16.3 | 13.1 | 17.1 | 16.9 | 11.2 | 11.5 |
| Tensile, MPa | 22.0 | 21.3 | 19.2 | 20.2 | 20.1 | 19.5 | 21.1 |
| Elongation % | 422 | 414 | 368 | 381 | 381 | 477 | 502 |
| Hardness | | | | | | | |
| 23° C. | 69.0 | 73.5 | 75.4 | 74.4 | 74.3 | 69.5 | 71.6 |
| 100° C. | 66.7 | 70.5 | 70.5 | 70.0 | 69.5 | 65.7 | 67.4 |
| E', MPa | 1.9 | 2.52 | 2.64 | 2.57 | 2.15 | 1.99 | 2.15 |
| Tan.delta 60° C. | 0.050 | 0.051 | 0.048 | 0.045 | 0.048 | 0.048 | 0.050 |
| Rebound, % | | | | | | | |
| 23° C. | 57.6 | 56.5 | 56.8 | 57.9 | 57.5 | 59.6 | 57.8 |
| 100° C. | 71.8 | 64.9 | 65.4 | 66.1 | 66.2 | 68.3 | 66.6 |

TABLE 4

All Silica Filled Compounds

| Compound # | Control H | Pre-mix (I) | In Situ (J) |
|---|---|---|---|
| Non-Productive | | | |
| Polyisoprene[1] | 100 | 100 | 100 |
| Treated Silica[2] | 0 | 52 | 0 |
| Silica[3] | 50 | 0 | 50 |
| Oil[4] | 5 | 5 | 5 |
| Zinc Oxide | 5 | 5 | 5 |
| Stearic Acid | 2 | 2 | 2 |
| Coupler[5] | 10 | 10 | 10 |
| DTDP[6] | 0 | 0 | 2 |
| Productive | | | |
| Accelerators[7] | 2.5 | 2.5 | 2.5 |
| Sulfur | 1.5 | 1.5 | 1.5 |

[1]Synthetic cis 1,4-polyisoprene rubber obtained as NATSYN® 2200 from The Goodyear Tire & Rubber Company.
[2]Pre-treated Filler X silica of Example I.
[3]HiSil-210 from PPG Industries, Inc.
[4]Naphthenic/paraffinic rubber processing oil.
[5]X50S as in Example II, Table 2.
[6]3,3'-dithiodipropionic acid.
[7]Of the sulfenamide type.

The rubber compositions of Table 4 were cured for about 36 minutes at about 150° C. Cure behavior and cured properties are shown in Table 5.

TABLE 5

| Sample # | H | Pre-mix (I) | In-Situ (J) |
|---|---|---|---|
| Rheometer | | | |
| Max Torque | 48 | 56.9 | 56.5 |
| Min Torque | 6.9 | 8.2 | 7.4 |
| delta Torque | 41.1 | 48.7 | 49.1 |
| $T_{90}$ | 17.5 | 24.4 | 29.9 |
| $T_2$ | 7 | 8.3 | 9.5 |
| Physicals | | | |
| 100% Mod, MPa | 3.1 | 4.3 | 4.0 |
| 300% Mod, MPa | 12.9 | 16.1 | 15.0 |
| Tensile, MPa | 21.9 | 21.4 | 21.5 |
| Elongation % | 491 | 419 | 443 |
| Hardness | | | |
| 23° | 69.5 | 76.6 | 75.7 |
| 100° C. | 67.6 | 72.9 | 71.7 |
| E', MPa | 1.60 | 2.56 | 2.75 |
| Tan D 60° C. | 0.051 | 0.035 | 0.034 |
| Rebound, % | | | |
| 23° | 56.9 | 58.9 | 57.1 |
| 100° C. | 71.3 | 66.9 | 65.2 |

Inspection of the physical properties shown in Table 5 clearly indicates that the experimental samples I and J which contain dithiodipropionic acid exhibit higher stiffening properties such as 100 percent modulus, hardness and E' than the Control H sample.

EXAMPLE IV

Rubber compositions were prepared in which 3,3'-dithiodipropionic acid and benzoic acid are blended in-situ with a carbon black reinforced rubber composition.

For the experimental (K) rubber composition dithiodipropionic acid was added in-situ in the non-productive mix stage.

For the experimental (L) rubber composition benzoic acid was added in the productive mix stage.

The rubber compositions were prepared and mixed by conventional rubber mixing processes and comprised of the materials shown in Table 6.

The rubber compositions were mixed by first blending the rubber and ingredients, except for the sulfur curatives and accelerators in an nonproductive mixing stage in an internal rubber mixer to a temperature of about 160° C. for about 4 minutes.

Sulfur and accelerators were then added in a final productive mix stage in an internal rubber mixer to a temperature of about 105° C. for about 2 minutes.

TABLE 6

| Sample # | K | L |
|---|---|---|
| 1st Non-Productive | | |
| Natural Rubber | 80 | 80 |
| Cis 1,4-Polybutadiene[1] | 20 | 20 |
| Carbon Black | 60 | 60 |
| Processing Oil | 4 | 4 |
| Antidegradants[2] | 1.8 | 1.8 |
| Zinc Oxide | 6 | 6 |
| Fatty Acid | 1 | 1 |
| Dithiodipropionic Acid | 1.5 | 0 |
| 2nd Non-Productive | | |
| Silica[3] | 5 | 5 |
| Bis-(3-triethoxysilylpropyl tetrasulfide (50% active) | 1 | 1 |
| Productive | | |
| Benzoic Acid | 0 | 1.5 |
| Sulfur | 3.2 | 3.2 |
| Accelerators[4] | 2.5 | 2.5 |
| Zinc Oxide | 2 | 2 |

[1]High cis 1,4-polybutadiene (BUDENE® 1207) from The Goodyear Tire & Rubber Company;
[2]Amine types;
[3]Hi-Sil 210 from PPG Industries, Inc;
[4]Sulfenamide type.

The rubber compositions were cured for about 36 minutes to a temperature of about 150° C.

The physical properties are shown in Table 7.

TABLE 7

| Sample # | K | L |
|---|---|---|
| Rheometer (150° C.) | | |
| Max. Torque, dNm | 56.0 | 56.9 |
| Min. Torque | 6.0 | 6.4 |
| Delta Torque | 50.0 | 50.5 |
| $T_{90}$, minutes | 12.9 | 9.8 |
| Stress-Strain | | |
| Tensile Strength, MPa | 16.2 | 15.2 |
| Elongation @ Break, % | 249 | 228 |
| 100% Modulus, MPa | 5.9 | 6.3 |
| Rebound | | |
| 100° C. | 64.8 | 62.0 |
| Hardness | | |
| Shore A, 100° C. | 72 | 73 |

The cured physical properties show that the addition of dithiodipropionic acid or benzoic acid to the rubber composition resulted in a rubber composition having a relatively high hardness value of about 72.

EXAMPLE V

Rubber compositions were prepared in which salicylic acid was blended with a carbon black reinforced natural rubber composition.

The formulation (M) was a control without salicylic acid being added.

For the experimental (N) rubber composition salicylic acid was added in the non-productive mix stage.

The rubber compositions were prepared and mixed by conventional rubber mixing processes and comprised of the materials shown in Table 8.

The rubber compositions were mixed by first blending the rubber and ingredients, except for the sulfur curatives and accelerators in an nonproductive mixing stage in an internal rubber mixer to a temperature of about 160° C. for about 4 minutes.

Sulfur and accelerators were then added in a final productive mix stage in an internal rubber mixer to a temperature of about 105° C. for about 2 minutes.

TABLE 8

| Sample # | M (Ctrl) | N |
|---|---|---|
| Non-Productive | | |
| Natural Rubber[1] | 100 | 100 |
| Carbon Black, N299 | 50 | 50 |
| Processing Oil | 5 | 5 |
| Antidegradants[2] | 2 | 2 |
| Zinc Oxide | 5 | 5 |
| Fatty Acid | 2 | 2 |
| Salicylic Acid | 0 | 2 |
| Productive | | |
| Sulfur | 1.4 | 1.4 |
| Accelerators[3] | 1 | 1 |

[1]Cis 1,4-polyisoprene;
[2]Amine types;
[3]Sulfenamide type.

The rubber compositions were cured for about 36 minutes to a temperature of about 150° C.

The physical properties are shown in Table 9.

TABLE 9

| Sample # | M (Ctrl) | N |
|---|---|---|
| Rheometer (150° C.) | | |
| Max. Torque, dNm | 37.7 | 40.2 |
| Min. Torque, dNm | 6.2 | 6.2 |
| Delta Torque | 31.5 | 34.0 |
| T$_{90}$, minutes | 18.8 | 24.5 |
| Stress-Strain | | |
| Tensile Strength, MPa | 21.3 | 23.1 |
| Elongation @ Break, % | 539 | 468 |
| 100% Modulus, MPa | 1.58 | 2.89 |
| Rebound | | |
| 100° C. | 61.1 | 59.5 |
| Hardness | | |
| Shore A, 100° C. | 48.0 | 65.2 |

The cured physical properties show that the addition of salicylic acid to the rubber composition resulted in a rubber composition having relatively high modulus and hardness values.

In the practice of this invention, it is considered important that the rubber compositions for one or more of the inserts are relatively very stiff, moderately hard, and have a low hysteresis.

It is important to appreciate that the indicated physical properties of the rubber compositions in Table 5 and 7 are for samples thereof and that the dimensions, including thickness, of the resulting tire components (inserts and plies) need be taken into account as factors contributing to the overall stiffness and dimensional stability of the tire sidewall and carcass.

The hysteresis or Tan Delta values for the rubber composition for the aforesaid fillers is desirably somewhat lower than that for the rubber composition for the aforesaid ply coat(s) because of the bulk of the inserts versus the thin dimensions of the plycoat.

In the practice of this invention, it is considered important that the rubber compositions for one or more of the inserts 12 are relatively very stiff, moderately hard, and have a low hysteresis.

Chafing of the tire in the lower bead region radially outward of the carcass structure adjacent the rim flange may be minimized, especially during use of the tire in the uninflated condition, by providing hard rubber chafer portion 7.

In one embodiment of the invention, a fabric overlay having cords at about zero degrees in relation to the centerplane of the tire is placed over the belt reinforcing structure 9.

While certain representative embodiments and details have been shown for the purpose of illustrating the invention, it will be apparent to those skilled in this art that various changes and modifications may be made therein without departing from the spirit or scope of the invention.

What is claimed is:

1. A tire comprised of a toroidally-shaped carcass and an outer, circumferential tread designed to be ground contacting, wherein said carcass is comprised of two spaced apart inextensible bead portions, two spaced apart sidewalls each individually extending radially inward from and connecting said tread to said bead portions, and at least one cord reinforced ply extending from bead to bead and through the sidewalls; an improvement in which a substantially crescent shaped rubber insert is juxtapositioned to and axially inward of at least one of said carcass plies in each of said sidewalls or the tire; wherein the rubber composition of said insert has a Shore A hardness at 100° C. in a range of about 65 to about 85, a 100 percent Modulus in a range of about 3.5 to about 10 MPa, a Hot Rebound at 100° C. in a range of about 60 to about 80, an E' value in a range of about 2 to about 20 MPa at 60° C. and 11 Hertz and a Tan.Delta value at 60° C. and 11 Hertz in a range of about 0.03 to about 0.15; and wherein said rubber composition of said insert is comprised of, based on 100 parts by weight rubber, (A) at least one diene-based elastomer, (B) about 30 to about 100 phr of particulate reinforcement as carbon black and silica, and a further improvement wherein said insert rubber composition contains (C) about 0.5 to about 10 phr of an acid selected from at least one of benzoic acid and salicylic acid, exclusive of dithiodipropionic acid.

2. The tire of claim 1 wherein at least one of said carbon black and silica particulate reinforcement is pre-treated with at least one of said benzoic acid and salicylic acid to form a composite thereof and said composite is first blended with ingredients for said rubber composition in the absence of free sulfur and of vulcanization accelerators, wherein free sulfur and vulcanization accelerators are subsequently mixed with the rubber composition; wherein for said pretreatment, said acid(s) is adsorbed, absorbed, coated or melt-sprayed onto the surface of said filler.

3. The tire of claim 1 wherein said acid is blended in-situ with ingredients for said rubber composition in the absence of free sulfur and vulcanization accelerators and free sulfur and vulcanization accelerators subsequently mixed with the rubber composition.

4. The tire of claim 1 wherein said acid is benzoic acid.

5. The tire of claim 1 wherein said acid is salicylic acid.

* * * * *